US 8,064,467 B2

(12) United States Patent
Lawrence et al.

(10) Patent No.: US 8,064,467 B2
(45) Date of Patent: Nov. 22, 2011

(54) SYSTEMS AND METHODS FOR NETWORK ROUTING IN A MULTIPLE BACKBONE NETWORK ARCHITECTURE

(75) Inventors: Joseph Lawrence, Boulder, CO (US); Nassar El-Aawar, Denver, CO (US); Darren Loher, Arvada, CO (US); Steven Craig White, Longmont, CO (US); Raoul Alcala, Superior, CO (US); Niclas Comstedt, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 842 days.

(21) Appl. No.: 11/565,563

(22) Filed: Nov. 30, 2006

(65) Prior Publication Data
US 2007/0086429 A1 Apr. 19, 2007

Related U.S. Application Data

(63) Continuation-in-part of application No. 11/347,810, filed on Feb. 3, 2006.

(60) Provisional application No. 60/650,312, filed on Feb. 4, 2005.

(51) Int. Cl.
H04L 12/28 (2006.01)
H04L 12/56 (2006.01)
(52) U.S. Cl. .................... 370/401; 370/395.31; 370/389
(58) Field of Classification Search .................. 370/401, 370/352, 351, 353, 216–228, 395.31, 389
See application file for complete search history.

(56) References Cited

U.S. PATENT DOCUMENTS

| 4,639,881 | A | 1/1987 | Zingher |
| 4,998,242 | A | 3/1991 | Upp |
| 5,068,916 | A | 11/1991 | Harrison |
| 5,119,370 | A | 6/1992 | Terry |
| 5,276,445 | A | 1/1994 | Mita |
| 5,467,347 | A | 11/1995 | Petersen |
| 5,541,914 | A | 7/1996 | Krishnamoorthy et al. |
| 5,845,215 | A | 12/1998 | Henry |
| 5,999,103 | A | 12/1999 | Croslin |
| 6,016,307 | A | 1/2000 | Kaplan et al. |
| 6,151,324 | A | 11/2000 | Belser et al. |

(Continued)

FOREIGN PATENT DOCUMENTS

JP 2000-165412 6/2000

(Continued)

OTHER PUBLICATIONS

International Searching Authority, U.S. Patent and Trademark Office and Receiving Office, International Search Report (Form PCT/ISA/210) for international application No. PCT/US07/61629, Feb. 26, 2008, 4 pages.

(Continued)

Primary Examiner — Chuong T Ho

(57) ABSTRACT

Embodiments of a network architecture include a backbone node having a plurality of independent routers or switches connected in a matrix, wherein the matrix includes a plurality of stages of routers or switches, to form a node having a node switching capacity that is greater than the node switching capacity of the individual routers or switches. A method includes assigning one of a plurality of backbone networks to a destination network address, associating a next hop loopback address with the destination network address, and advertising the destination network address in combination with the next hop loopback address through the selected backbone network address.

14 Claims, 12 Drawing Sheets

U.S. PATENT DOCUMENTS

| | | | |
|---|---|---|---|
| 6,335,992 | B1 | 1/2002 | Bala et al. |
| 6,574,335 | B1* | 6/2003 | Kalmanek et al. ............ 379/386 |
| 6,600,741 | B1 | 7/2003 | Chrin et al. |
| 6,665,273 | B1 | 12/2003 | Goguen et al. |
| 6,981,055 | B1 | 12/2005 | Ahuja et al. |
| 6,982,974 | B1 | 1/2006 | Saleh et al. |
| 7,020,087 | B2* | 3/2006 | Steinberg et al. ............. 370/238 |
| 7,027,396 | B1* | 4/2006 | Golan et al. ................... 370/232 |
| 7,106,729 | B1 | 9/2006 | Gullicksen et al. |
| 7,307,948 | B2 | 12/2007 | Infante et al. |
| 7,342,922 | B1 | 3/2008 | Vanesko |
| 7,424,010 | B2 | 9/2008 | Konda |
| 7,436,838 | B2* | 10/2008 | Filsfils et al. ............. 370/395.31 |
| 7,554,930 | B2* | 6/2009 | Gaddis et al. ................. 370/254 |
| 7,596,135 | B1 | 9/2009 | Iovine et al. |
| 7,626,936 | B1* | 12/2009 | Golan et al. .................. 370/237 |
| 2003/0058880 | A1 | 3/2003 | Sarkinen et al. |
| 2004/0008674 | A1 | 1/2004 | Dubois |
| 2004/0105456 | A1 | 6/2004 | Lanzone et al. |
| 2004/0136385 | A1 | 7/2004 | Xue et al. |
| 2004/0264448 | A1 | 12/2004 | Wise et al. |
| 2005/0002334 | A1 | 1/2005 | Chao et al. |
| 2005/0050243 | A1 | 3/2005 | Clark |
| 2005/0063395 | A1 | 3/2005 | Smith et al. |
| 2005/0068960 | A1 | 3/2005 | Green et al. |
| 2005/0111465 | A1 | 5/2005 | Stewart |
| 2005/0135405 | A1 | 6/2005 | Garland et al. |
| 2005/0152305 | A1* | 7/2005 | Ji et al. .......................... 370/328 |
| 2005/0201302 | A1 | 9/2005 | Gaddis et al. |
| 2005/0220096 | A1 | 10/2005 | Friskney et al. |
| 2005/0254527 | A1 | 11/2005 | Jakel et al. |
| 2006/0008273 | A1 | 1/2006 | Xue et al. |
| 2006/0074618 | A1 | 4/2006 | Miller et al. |
| 2006/0104281 | A1 | 5/2006 | Scarr et al. |
| 2006/0140136 | A1* | 6/2006 | Filsfils et al. ................. 370/255 |
| 2006/0153067 | A1* | 7/2006 | Vasseur et al. ................ 370/217 |
| 2006/0153200 | A1 | 7/2006 | Filsfils et al. |
| 2006/0165087 | A1 | 7/2006 | Page et al. |
| 2006/0200579 | A1 | 9/2006 | Vasseur |
| 2006/0209687 | A1 | 9/2006 | Yagawa et al. |
| 2006/0209816 | A1 | 9/2006 | Li et al. |
| 2006/0215672 | A1 | 9/2006 | Lawrence et al. |
| 2007/0064688 | A1 | 3/2007 | Prettegiani |
| 2008/0151863 | A1 | 6/2008 | Lawrence et al. |
| 2008/0212472 | A1 | 9/2008 | Musacchio et al. |
| 2008/0316914 | A1* | 12/2008 | Vercellone et al. ........... 370/216 |
| 2008/0320166 | A1* | 12/2008 | Filsfils et al. ................. 709/242 |
| 2009/0141632 | A1 | 6/2009 | Lawrence et al. |

FOREIGN PATENT DOCUMENTS

| | | |
|---|---|---|
| JP | 2004/507136 | 3/2004 |
| JP | 2004/350078 | 12/2004 |
| WO | 0217110 A1 | 2/2002 |
| WO | WO-02/15017 | 2/2002 |
| WO | WO-2006084071 | 8/2006 |

OTHER PUBLICATIONS

International Searching Authority, U.S. Patent and Trademark Office and Receiving Office, Written Opinion of the International Searching Authority (Form PCT/ISA/237) for international application No. PCT/US07/61629 Feb. 26, 2008, 8 pages.

International Searching Authority, U.S. Patent and Trademark Office and Receiving Office, International Search Report (Form PCT/ISA/210) for international application No. PCT/US07/85977, Apr. 30, 2008, 3 pages.

International Searching Authority, U.S. Patent and Trademark Office and Receiving Office, Written Opinion of the International Searching Authority (Form PCT/ISA/237) for international application No. PCT/US07/85977, Apr. 30, 2008, 4 pages.

Cisco Systems, Inc., Cisco IOS Software Releases 12.1T, Virtual Switch Interface Master MIB Feature Guide, 9 pages, retrieved Aug. 27, 2007 from URL: <http://www.cisco.com/en/US/products/sw/iosswrel/ps1834/products_feature_guide09186a.

Cisco Systems, Inc., Cisco Packet Telephone Center Virtual Switch Version 3.1 Data Sheet, 7 pages, retrieved Aug. 27, 2007 from URL: <http://www.cisco.com/en/US/products/sw/netmgtsw/ps2025/products_data_sheet09186a00.

Cisco Systems, Inc., Cisco MGX 8800 Series Switches, Cisco Virtual Switch Architecture (white paper), 5 pages, retrieved from URL: <http://www.cisco.com/en/US/products/hw/switches/ps1938/products_white_paper09186a0.

Written Opinion of the International Searching Authority (Form PCT/ISA/237), prepared by U.S. Patent and Trademark Office as International Searching Authority for International Application No. PCT/US06/03740, Jul. 27, 2007, 4 pages.

International Search Report (Form PCT/ISA/210), prepared by U.S. Patent and Trademark Office as International Searching Authority for International Application No. PCT/US06/03740, Jul. 27, 2007, 2 pages.

*Non-Final Office Action* mailed Sep. 15, 2008, U.S. Appl. No. 10/347,810, filed Feb. 3, 2006, Applicant: Joseph Lawrence et al., 16 pages.

European Search Report, The Hague, EPP290990, Mar. 2, 2006, Jul. 22, 2009, 6 pages.

McDermott, Tom and Brewer, Tony, "Large-scale IP router using a high-speed optical switch element [invited]", Journal of Optical Networking, vol. 2, Issue 7, Jun. 6, 2003) XP 008108607, pp. 229-240.

Non-Final Office Action mailed Jun. 1, 2009, U.S. Appl. No. 11/347,810, filed Feb. 3, 2006, Applicant Joseph Lawrence, 35 pages.

Smiljanic A., "Load balancing mechanisms in close packet switches", Communications, 2004 IEEE International Conference on Paris France, Jun. 20-24, 2004, Piscataway NJ, USA, IEEE, vol. 4, Jun. 20, 2004, XP010712226, isbn 978-0-7803-8533-7, pp. 2251-2255.

"Canadian Office Action dated May 28, 2010", counterpart application No. 2,657,111, originally filed Feb. 5, 2007, Systems and Methods for Network Routing in a Multiple Backbone Network Architecture, 5 pgs.

"Canadian Office Action dated Sep. 21, 2010", counterpart application No. 2,595,788, originally filed Feb. 3, 2006, Ethernet-Based Systems and Methods for Improved Network Routing , 2 pgs.

"Chinese Office Action dated Dec. 22, 2010,", counterpart application No. 200780025193.4, originally filed Feb. 5, 2007, Systems and Methods for Network Routing in a Multiple Backbone Network Architecture, , 5 pgs.

"Chinese Office Action dated Jan. 18, 2011,", counterpart CN application No. 200680003986.1, filed Feb. 3, 2006, , 11 pgs.

"Claims 1-16 as filed in Canadian counterpart", patent application No. 2,595,788, filed Feb. 3, 2006, Ethernet-Based Systems and Methods for Improved Network Routing , pp. 8-10.

"European Examination Report dated Dec. 9, 2009,", counterpart EP application No. 06720174.9, Referring to European Search Report of Jul. 30, 2009, Ethernet-Based Systems and Methods for Improved Network Routing, , 1 pg.

"European Examination Report dated Feb. 7, 2011,", counterpart EP application No. 07710455.2, , 4 pgs.

"European Examination Report dated Jul. 15, 2010,", counterpart EP application No. 07710455.2, Systems and Methods for Network Routing in a Multiple Backbone Architecture, , 7 pgs.

"European Extended Search Report dated Nov. 22, 2010,", counterpart EP application No. 07864928.2, System and Method for Switching Traffic Through a Network , 3 pgs.

"European Search Report dated Apr. 16, 2010", counterpart EP application No. 07710455.2, Systems and Methods for Network Routing in a Multiple Backbone Architecture , 11 pgs.

"European Search Report dated Jul. 30, 2009,", counterpart EP application No. 06720175.9, Ethernet-Based Systems and Methods for Improved Network Routing, , 6 pgs.

"European Written Opinion, dated Nov. 22, 2010,", counterpart EP application No. 07864928.2, System and Method for Switching Traffic Through a Network, , 4 pgs.

"Japanese Office Action dated May 11, 2010,", counterpart JP application No. 2007-554219, Ethernet-Based Systems and Methods for Improved Network Routing, 4 pgs.

Rekhter, Y. et al., "A Border Gateway Protocol 4 (BGP-4)", T.J. Watson Research Center, IBM Corp., Cisco Systems Editors Mar. 1995, 58 pgs.

Walker, Paul, "Interface for Home Network", *IEEE 1355, NIKEI Electronics* vol. 589, May 19, 1997, pp. 71-183.

"Canadian Examination Report dated Mar. 4, 2011", CA Appl. No. 2655984, 3 pgs.

"Japanese Office Action, dated Mar. 22, 2011", JP Appl. No. 2007/554219, 6 pgs.

Morisita, Isao "What is the Truth of Gigabit Ethernet Now?", *Computer & Network Lan* vol. 16, No. 8 Aug. 1, 1998, 81-92.

Tsuchihashi, N. "Tips when mere sight of Spec List helps you in distinguishing good or bad products, Manual for introduction of custom switch and router, Don't you choose a product in view of only its bland image and price?", *Network World* vol. 9, No. 1 Jan. 1, 2004, 44-50.

"European Exam Report, dated May 2, 2011", EP App. No. 06720174.9, , 6 pgs.

Nenov, G. "Transporting Ethernet services in metropolitan area networks", *Networks, 2004. (ICON 2004). Proceedings. 12th IEEE International Conference on Singapore* Nov. 16-19, 2004, 53-59 pgs.

Nitzberg, B. "The P-Mesh-a commodity-based scalable network architecture for clusters", *Systems Sciences, 1999. HICSS-32. Proceedings of the 32nd Annual Hawaii International Conference on Maui*, HI, USA Jan. 5, 1999, 10 pgs.

* cited by examiner

SYSTEMS AND METHODS FOR NETWORK ROUTING IN A MULTIPLE BACKBONE NETWORK ARCHITECTURE

REFERENCE TO RELATED APPLICATION

This application is a continuation-in-part of U.S. patent application Ser. No. 11/347,810, filed Feb. 3, 2006, and entitled "Ethernet-based Systems and Methods for Improved Network Routing", which claims the benefit of U.S. Provisional Application Ser. No. 60/650,312, filed Feb. 4, 2005, and entitled "Systems And Methods For Improved Network Routing", both of which are incorporated herein in their entireties.

FIELD

The present invention relates generally to network routing, and more specifically to systems and methods for network routing in a multiple backbone network architecture.

BACKGROUND

High speed internet prices continue to drop, but the underlying costs of maintaining and operating the networks remain relatively high. One of the main factors in keeping the unit costs high is the high cost for the terabit Multiple protocol Label Switching (MPLS) backbone routers. Accordingly, as bandwidth requirements grow, the costs will likely grow as well.

SUMMARY

Embodiments of a network include a backbone node that includes a plurality of independent routers or switches connected in a matrix, wherein the matrix includes a plurality of stages of routers or switches, to form a node having a node switching capacity that is greater than the node switching capacity of the individual routers or switches. The routers or switches may be connected in an N×M Internet Protocol (IP) based CLOS matrix, wherein N>1 is the number of stages in the matrix and M>1 is the number of routers or switches in each stage. Traffic may be directed among the routers or switches using IP or Ethernet routing protocols. Traffic may be load balanced using one or more load balancing techniques selected from a group consisting of equal cost load balancing, traffic engineering, or flow-based load balancing. A number of links may be provisioned on the routers or switches in a manner that supports the traffic balancing technique performed by the node.

Various embodiments of a network include a plurality of backbone networks supporting communications between a source communication site and a destination communication site, a source provider edge device in communication with the plurality of backbone networks and a source provider network at the source communication site, and a destination provider edge device in communication with the plurality of backbone networks and a destination provider network at the destination communication site, wherein the destination provider edge device is configured to select one of the backbone networks from the plurality of backbone networks to handle communications associated with a destination address in the destination provider network.

In various embodiments, the destination provider edge device selects the backbone network using an external least-cost routing protocol. The destination provider edge device may associate a next hop loopback address and/or a backbone identifier with the destination address, wherein the backbone identifier identifies the selected backbone network. The destination provider edge device may further communicate an advertisement through one or more of the plurality of backbone networks, wherein the advertisement includes at least the destination address and the next hop loopback address. The source provider edge device can be configured to receive the advertisement and write the destination address and the next hop loopback address to a route map, whereby packets subsequently sent from the source network to the destination address are routed to the next hop loopback address over the selected backbone network. The destination provider edge device may communicate the advertisement during an open shortest path first (OSPF) protocol process. The advertisement may further include the backbone identifier.

The destination provider edge device may associate the backbone identifier and the next hop loopback address with the destination address in a route map. The destination provider network may include a first destination provider network and the destination address may include a first destination address. The destination provider edge device may further be in communication with a second destination provider network including a second destination address at a second destination communication site, wherein the destination provider edge device is further configured to use an external least-cost routing protocol to select a second one of the backbone networks from the plurality of backbone networks to handle communications associated with the second destination address. The destination provider edge device may be further configured to associate a second next hop loopback address with the second destination address. The source provider edge network may be configured to assign a lower routing cost to the second next hop loopback address than a routing cost assigned to the next hop loopback address associated with the first destination address, whereby packets addressed to the second destination address are routed through the second backbone network.

Embodiments of a method for routing packets to a first destination network address include steps of assigning a first one of a plurality of backbone networks to the first destination network address, associating a first next hop loopback address with the first destination network address, and advertising the first destination network address in combination with the first next hop loopback address through the first backbone network address, whereby packets addressed to the first destination network address are routed through the first backbone network. The method may further include associating a first community identifier representing the first backbone network with the first destination network address. The method may further include creating a route map including an association between the first destination network address and the first next hop loopback address and an association between the first destination network address and the first community identifier.

Some embodiments of the method may still further include assigning as second one of the plurality of backbone networks to a second destination network address, associating a second next hop loopback address with the second destination network address, and advertising the second destination network address in combination with the second next hop loopback address through the second backbone network address, whereby packets addressed to the second destination network address are routed through the second backbone network. The first backbone network and the second backbone network may be different backbone networks.

In accordance with various embodiments of a method, packets addressed to the first destination network address may be routed through the first backbone network to the first next hop loopback address using an Internal Gateway Protocol. The method may further include setting an internal least cost routing metric to a provider edge site identifier. Still further, the method may include setting an internal least cost routing metric associated with the second next hop loopback address in the second backbone network equal to a value less than another internal least cost metric associated with the first next hop loopback address in the second backbone network. The first destination network address and the second destination network address may be associated with different routes through one or more customer edge networks.

In various embodiments of systems and methods, an edge router or core router associated with a backbone network may support two internal least cost routing protocols. The router can perform a first internal least cost routing process through a port on the router facing the backbone network, and another least cost routing process through another port on the router facing an edge network. The first backbone network may serve as a backup network to the second backbone network.

An embodiment of a computer-readable medium includes computer-executable instructions for causing a computer to perform a process of routing packets to a destination endpoint. An embodiment of the process includes for each of a plurality of Internet service provider (ISP) networks, assigning the Internet service provider network to one of a plurality of backbone networks operating in a parallel backbone network architecture, receiving a packet addressed to a destination associated with one of the ISP networks, selecting the backbone network assigned to the ISP network associated with the destination endpoint, and routing the packet through the selected backbone network.

In accordance with some embodiments of the computer-readable medium, selecting the backbone network includes accessing a least-cost route map to determine which backbone network provides least cost routing to the ISP network associated with the destination endpoint. Selecting the backbone network may further include determining an address of an edge node associated with the selected backbone network. Embodiments of the process may further include receiving an advertisement from a node in each of the ISP networks and determining a least-cost backbone network from the plurality of backbone networks through which to route each of the advertisements.

Still further, embodiments of the process may further include further setting a next hop loopback address for each of the backbone networks, such that an internal least-cost routing process in each of the backbone networks will cause packets destined for the ISP network assigned to the backbone network to be routed to the next hop loopback address. The process may further include, for each of the backbone networks, embedding the associated next hop address in an advertisement routed through the backbone network. Further yet, the process may also involve assigning a cost metric to each next hop loopback address based on routes associated with the next hop loopback addresses. Assigning a cost to a next hop loopback address may include assigning a cost metric to the loopback address that is lower than the cost metric for all other next hop loopback addresses for routes through the backbone network associated with the next hop loopback address.

In accordance with an embodiment of a network architecture, the network architecture includes a plurality of backbone networks, wherein each backbone network is configured to route packets therethrough from a source network to a destination network, and a provider edge device configured to select one of the backbone networks through which to route a packet, wherein the provider edge device selects a least-cost backbone network assigned to the destination network, wherein the least-cost backbone network is selected from the plurality of backbone networks. The provider edge device may be further configured to assign one of the plurality of backbone networks to the destination network based on a least-cost routing protocol.

Still further the provider edge device may be configured to receive an advertisement message from the destination network and route the advertisement message through the assigned backbone network, where by other provider edge devices route packets destined for the destination network through the assigned backbone network. The provider edge device may be further configured to embed a next hop loopback address in the advertisement message. The provider edge device may be further configured to assign a cost metric to the next hop loopback address. The cost metric may be chosen relative to other cost metrics associated with other next hop loopback addresses based on a route associated with the next hop loopback address.

Further yet, the provider edge device may be configured to receive an advertisement message associated with another network and assign a next hop loopback address included in the advertisement message to the backbone network from which the advertisement message was received. The provider edge device may assign the next hop loopback address to the backbone network in a route map. The provider edge device may be further configured to build a least-cost routing table that associates each of a plurality of next hop loopback addresses with a cost metric based on the backbone network associated with the next hop loopback address.

In some embodiments of a network architecture including multiple backbone networks, at least one of backbone networks may serve as a backup network to at least one of the other backbone networks. At least one of the backbone networks may include a backbone node including an N×M IP-implemented CLOS matrix of Ethernet switches, where $N>1$ is the number of stages in the matrix and $M>1$ is the number or switches in each stage.

An embodiment of a method for providing communications between provider networks, includes for each of a plurality of communication routes through one or more provider networks: receiving an advertisement having a network address associated with the communication route, selecting a backbone network from a plurality of backbone networks using an external least-cost routing protocol, associating a first next hop loopback address with the destination address, wherein the first next hop loopback address is reachable via the selected backbone network, assigning a first cost to the next hop loopback address, wherein the first cost is less than a second cost associated with a second next hop loopback address reachable by another backbone network, advertising the first next hop loopback address over the plurality of backbone networks, wherein advertising includes indicating the first cost of accessing the first next hop loopback address via the selected backbone network.

Yet another embodiment of a method includes assigning a destination network address to a backbone network selected from a plurality of backbone networks using an external least cost routing protocol, associating a next hop loopback address with the destination network address, wherein the next hop loopback address corresponds to a port on a destination provider edge device in communication with the selected backbone network, notifying a source provider edge device that the next hop loopback address is reachable with least cost routing via the selected backbone network. Notifying the source provider edge device may include performing an internal least cost routing protocol between the source provider edge device and a source core router device in the selected backbone network. The method may further include performing the internal least cost routing protocol process between the source core router device and a destination core router device to determine a cost associated with the next hop loopback address.

DETAILED DESCRIPTION OF THE PREFERRED EMBODIMENTS

Figure 1:
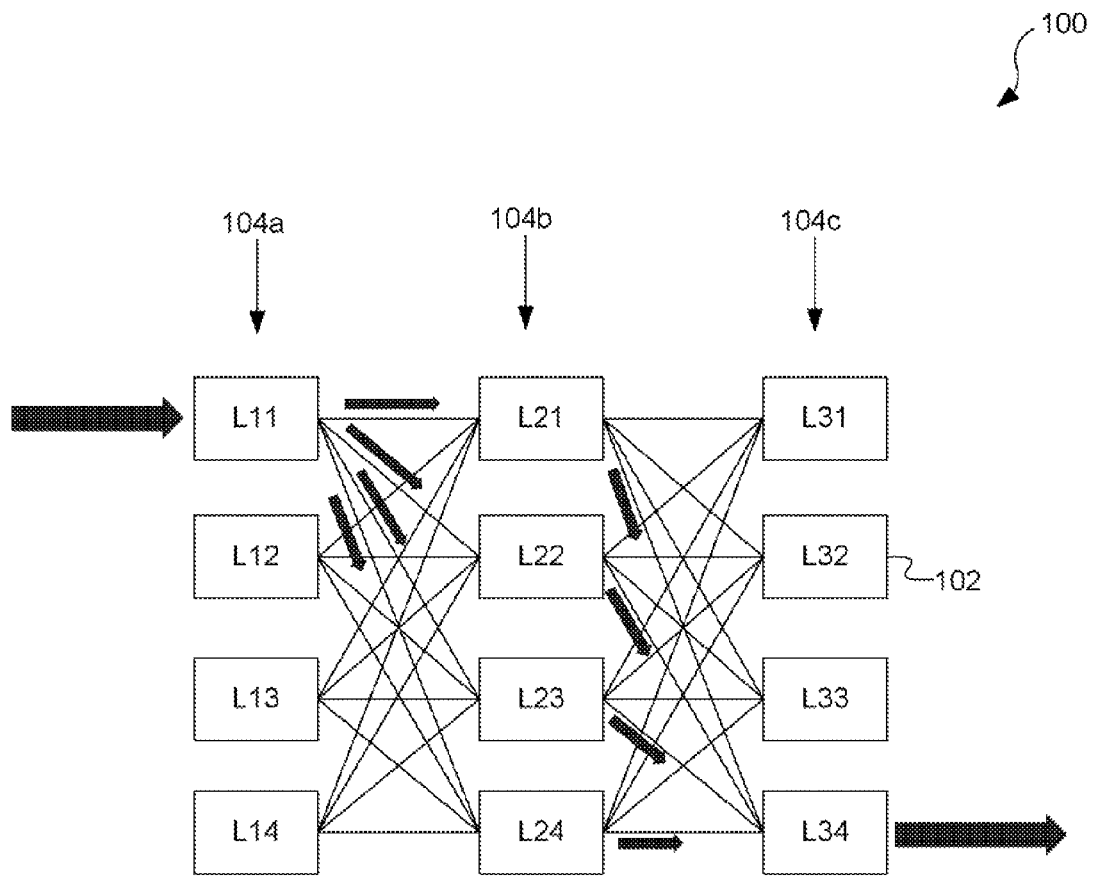
FIG. 1 is a diagrammatic illustration of a three-stage multichassis Ethernet router (MER) in accordance with one embodiment of the invention.

Embodiments include systems and methods that provide for multiple backbone networks to support communications between networks. A first routing protocol is used by a provider edge device to select a backbone network from the multiple backbone networks for handling communications associated with one or more associated network addresses. The provider edge network device assigns a port with a next hop loopback address to the associated one or more network addresses. A second routing protocol is used to notify other provider edge network devices that the selected backbone network should be used to carry packets addressed to the associated one or more network addresses.

Exemplary networks that utilize the services of backbone networks are Internet service provider (ISP) or network service providers (NSPs) networks that provide end user network services to home and business Internet users. ISPs typically have networks at multiple geographic sites where the backbone network also has provider edge network devices to interface with ISP networks. More specifically, embodiments provide for assigning one of a plurality of backbone networks to handle communications associated with an ISP network address. An external least cost routing protocol process, such as border gateway protocol (BGP), can be used to assign a backbone network to an ISP network address. An internal least cost routing protocol process can be used to ensure that packets addressed to the ISP network address are routed through the assigned backbone.

In accordance with an embodiment, a provider edge node carries out an external least cost routing protocol to select a least cost backbone associated with a given ISP network address. The provider edge node assigns a next hop loopback address to the given ISP network address. The next hop loopback address is reachable through the selected backbone network. The next hop loopback address is advertised in combination with the given ISP network address over one or more of the backbone networks. An internal least cost routing protocol process is carried out to notify one or more other provider edge devices that the next hop loopback address is reachable at least cost through the selected backbone network. In some embodiments, a backbone identifier is associated with a given ISP network address, along with the associated next hop loopback address. One or more provider edge nodes can update or create a route map to include an association between the given ISP network address, the backbone identifier, and the next hop loopback address.

In accordance with various embodiments, an external least cost routing protocol process can be carried out for multiple ISP network addresses being advertised to a backbone service provider network. Because there are multiple backbones in the backbone service provider network, one or more of the ISP network addresses may be assigned a backbone network that is different from the backbone network that is assigned to one or more other ISP network addresses. The one or more ISP network addresses could be associated with a single ISP network or multiple ISP networks. As such, different ISP network addresses in one ISP network could be assigned different backbone networks.

In various embodiments, to ensure that packets are routed to a particular next hop loopback address via an assigned backbone network, the next hop loopback address is tagged with an identifier for the assigned backbone network. An advertisement can include a tag associated with the assigned backbone network and/or the next hop loopback address, in order to identify a route through the assigned backbone network to handle communications for associated network addresses.

According to some embodiments, the backbone network selection process and the existence of multiple backbone networks is invisible to the ISP networks and endpoints associated with the ISP network addresses. As such, backbone network service with multiple backbone networks need not appear any different than backbone network service with a single backbone network. Although in various embodiments a particular backbone network is assigned to each ISP network address, in some embodiments, one or more other backbone networks can be used as backup networks for the assigned backbone network.

Typically, a backbone network service provider initially has one backbone network. The backbone network service provider may add one or more backbone networks to the backbone network service provider network. When one or more backbone networks are added, ISP network addresses and/or routes may be migrated from the initial backbone network to one or more of the new backbone networks. Migrating involves reassigning one or more ISP network addresses to the new backbone networks. A redistribution process can be performed to cause provider edge devices to route packets to a destination ISP network address via the backbone network assigned to the destination ISP network address. An embodiment of the redistribution process includes core nodes on a new backbone network carrying out an internal least cost routing protocol process with provider edge nodes and another internal least cost routing protocol process with core nodes throughout the new backbone network. The next hop loopback address associated with the new backbone network and associated migrated ISP network addresses are advertised across the new backbone network with a lower cost metric than the a corresponding cost metric for the initial backbone network.

Some embodiments relate to a network architecture that includes a backbone node having of independent routers or switches connected in matrix configuration resulting in a node switching capacity that is greater than the node switching capacity of the individual routers. The routers or switches may be connected in an N×M Internet Protocol (IP) implemented CLOS matrix, where N>1 is the number of stages in the matrix and M>1 is the number of routers or switches in each stage. Using this network architecture and matrix, the traffic is directed among the routers or switches using standard IP or Ethernet routing protocols and load balancing techniques that may include but are not limited to equal cost load balancing, traffic engineering, or flow based load balancing. The links are provisioned on the routers in a manner to best interoperate with traffic balancing of the node.

DEFINITIONS

A module is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

The term "backbone network" or "backbone" refers to a network that communicably connects two or more networks or subnetworks and provides communication traffic routing therebetween. A backbone network is typically geographically distributed to provide routing between multiple geographic sites. Thus, in some cases, a backbone network is a wide area network (WAN). Backbone networks include core routers and other nodes that facilitate packet routing.

A "customer network" or "provider network" are examples of third party networks that may interface with a provider edge network or device to thereby communicate across one or more backbone networks.

A "customer edge device" or "provider edge device" are devices that interface with third party networks, such as customer networks, and one or more backbone networks to route traffic between the third party networks and the one or more backbone networks. Typically, customer edge devices interface with one or more core nodes, such as core routers, in the backbone networks to route communication traffic to and from the backbone networks.

A "customer edge network", "provider edge network", or "peering edge network" are networks communicably between third party networks and one or more backbone networks, and include one or more customer edge devices. In some embodiments, a local area network (LAN) is communicably located between backbone network core nodes and customer edge network nodes.

Various systems and processes have been developed to provide backbone network routing between networks. These systems can be used individually or together to form a cost effective, scalable core backbone network and/or edge network. The systems include a multi-chassis Ethernet router ("MER"), a multiple parallel backbone configuration ("N× BB"), and a LAN in the middle ("LIM") configuration, Multi-Chassis Ethernet Router (MER)

One way to scale backbone networks larger at lower costs is to use a network or matrix of Ethernet switches to perform the functions currently being performed by expensive routers. These Ethernet switch matrices can be used in place of the terabit Multiple protocol Label Switching (MPLS) backbone routers, as well as in place of gigabit access routers at the edge of a network backbone. By using the Ethernet switch matrices, unit costs can be lowered.

While cost is a concern, scalability (i.e., the ability to grow with bandwidth demands) is also a concern when designing and implementing new systems. In fact, some forecasters are estimating a significant demand growth. Thus, the ability to scale the network at reasonable costs may be desirable in some cases.

In one embodiment, the MER will comprise a multi-stage CLOS matrix (e.g., 3 stages) router built out of Ethernet switches. The MER will use IP protocols to distribute traffic load across multiple switch stages. This design leverages existing technology, but allows scalability by adding additional Ethernet switches, additional stages, a combination or both, or new, inexpensive MERs.

FIG. 1 is a diagrammatic illustration of one embodiment of a 3-stage MER 100 in accordance with one embodiment of the invention. In this particular embodiment, the MER utilizes 4 Ethernet switches 102 in each of the three stages 104a-104c. Again, additional switches 102 or stages can be added. In this particular example, as illustrated by the arrows in FIG. 1, traffic destined out L34 arrives at L11. L11 equally distributes the traffic across L21-L24 using one or more load balancing or distribution methods. L21-L24 forwards traffic to L34, which combines the flows and forwards them out the necessary links. This design provides a dramatic increase in scale. For example, in the illustrated embodiment, a 4× MER 100 provides a 4× increase in node size. The maximum increase for a 3 stage fabric is (n^2)/2, where n is the number of switches used in each stage. Five stage and seven stage matrices will further increase scalability.

The Multi-Chassis Ethernet Router 100 may be viewed as a packet-level CLOS matrix. While CLOS matrices are known for use in bit-level applications, CLOS matrices have not been implemented in a network of Ethernet switches operating on the packet level, which is what this particular implementation provides. Further, the CLOS matrices typically implemented in the very expensive MPLS routers are implemented using proprietary software and are encompassed into a single box. In this particular implementation, multiple inexpensive Ethernet switches are formed into the matrix, and the CLOS distribution is implemented using IP protocols, rather than a proprietary software. Further, in this particular implementation, the CLOS matrix is implemented at each hop of the switches, instead of in a single device. Other protocols can be used in other embodiments.

After the Ethernet switches 102 are connected together, the packets and/or packet cells can be distributed to the different stages 104 of the matrix using flow based load balancing. Internal gateway protocols ("IGP") can be used to implement the load balancing techniques. In some embodiments, the MER 100 can utilize equal cost load balancing, so that each third-stage box (i.e., L31, L32, L33 and L34) associated with a destination receives the same amount of traffic. For example, if boxes L1, L2 and L3 all communicate with a New York-based provider edge site or router, each box will receive the same amount of traffic. This technique is relatively easy to implement and scales well, when new MERs are implemented.

In another embodiment, traffic on the MER 100 can be distributed using bandwidth aware load balancing techniques, such as traffic engineering techniques (e.g., MPLS traffic engineering) that send packets to the least busy switch. In one embodiment, the middle layer 104b can run the traffic engineering functionality, thus making intelligent routing decisions.

In yet another embodiment, traffic awareness techniques in the middle layer 104b (i.e., L21, L22, L23, and L24) can be used to determine what the downstream traffic requirements might be. That is, the middle layer 104b can determine demand placed on the third or last layer 104c and then determine routing based on the capacity needs. In this embodiment, the middle layer 104b can receive demand or capacity information from the last (e.g., third) layer 104c via traffic engineering tunnels (e.g., MPLS tunnels) or via layer 2 VLANS. Alternatively, changes to IGP can be leveraged to communicate bandwidth information to the middle layer 104b. For example, switch L31 can communicate to the middle layer 104b (e.g., via IGP or other protocols) that it is connected to a New York-based site with 30 Gb of traffic. The middle layer 104b can use this protocol information, as well as information from the other switches, to load balance the MER 100.

In another embodiment, an implementation of the MER 100 can use a control box or a route reflector to manage the MER 100. In some embodiments, the route reflector or control box can participate in or control routing protocols, keep routing statistics, trouble shoot problems with the MER, scale routing protocols, or the like. In one embodiment the route reflector can implement the routing protocols. So, instead of a third stage in a MER communicating with a third stage in another MER, a route reflector associated with a MER could communicate with a route reflector associated with the other MER to determine routing needs and protocols. The route reflector could utilize border gateway protocols ("BGP") or IGP route reflection protocols could be used (e.g., the route reflector could act as an area border router).

Multiple Parallel Backbones N×BB

Figure 2:
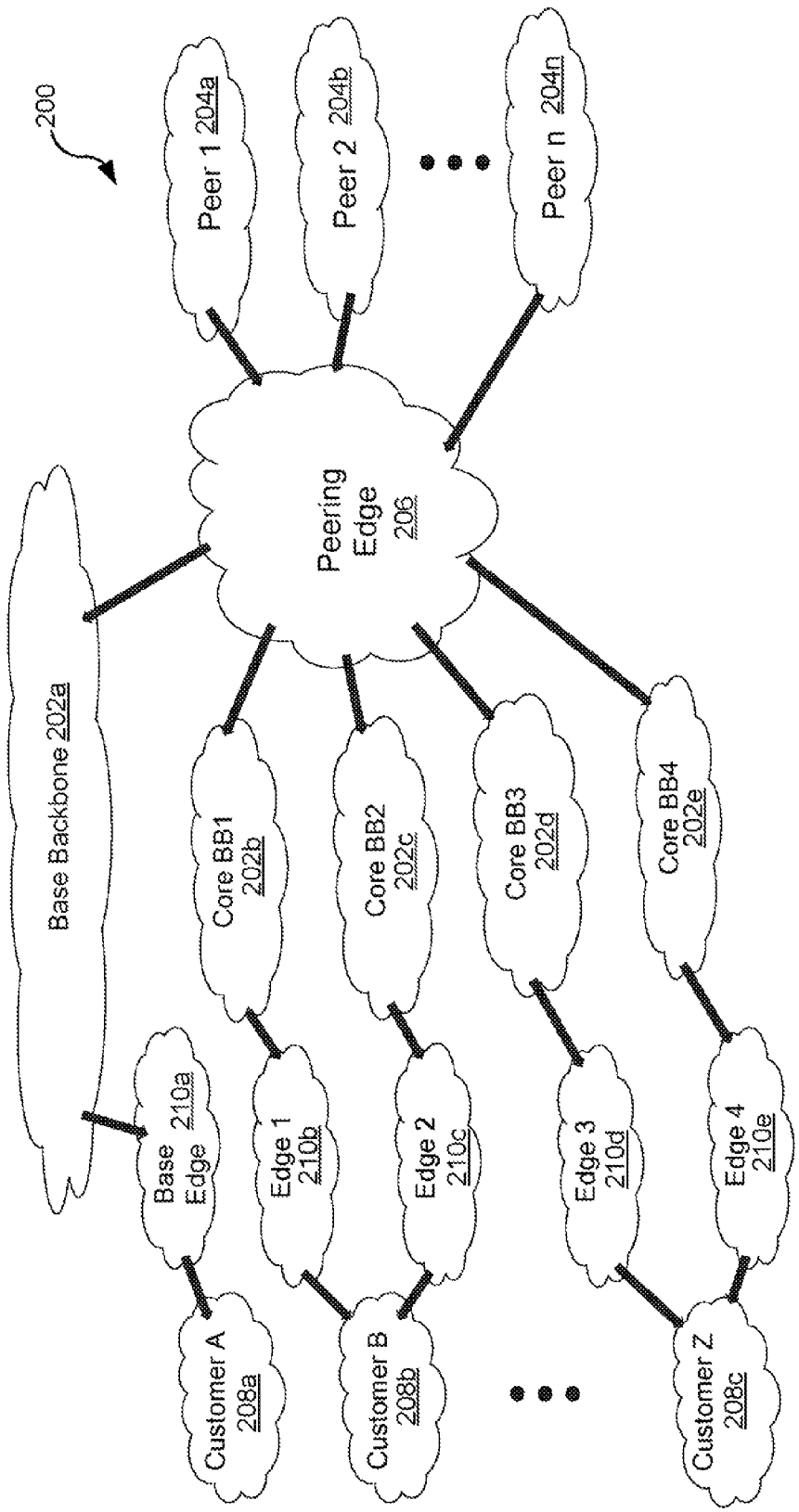
FIG. 2 is a diagrammatic illustration of multiple parallel backbones (N×BB) connected to peer and edge networks in accordance with another embodiment of the invention.

Another implementation that can be utilized to scale a core backbone network is to create multiple parallel backbone networks. One embodiment of a multiple parallel backbone architecture 200 is illustrated in FIG. 2. With the N×BB configuration 200, traffic can be split across multiple backbones to increase scale. More specifically, each backbone network can be selectively assigned to one or more network addresses, such that the assigned backbone network handles communication traffic (e.g., packets) associated with the assigned one or more network addresses.

In the embodiment shown in FIG. 2, the multiple parallel backbone architecture 200 has deployed therein a series of parallel backbone networks 202a-202e between core sites. The backbones can use large MPLS routers, Ethernet switches, the MERs discussed above, or any other suitable routing technology. In addition, in the illustrated embodiment, peers 204a-204n can connect to the backbones 202 through a common peering infrastructure or edge 206 connected to each backbone, and customers 208a-208n can connect to specific backbone edges 210a-210e. That is, peers 204 are connected to the parallel backbone networks 202 (BB, BB1, BB2, BB3 and BB4) through a single peering edge 206, and customers 208 are connected to the backbones 202 through separate edge networks 210. In FIG. 2, each backbone network 202 has its own customer edge 210 network. In alternative embodiments, however, only one or just a couple of edge networks 210 might be utilized (similar to one peering edge). The edge network 210 also can use different routing technologies, including the MERs discussed above. The use of MERs can help with scaling of the peering edge 206.

The arrows in FIG. 2 illustrate an example of traffic flows 212 in a parallel backbone network architecture 200. In this example, traffic 214 destined for customers A-Z 208a-208n arrives from Peer #2 204b Devices on the peering edge network 206, such as provider edge devices, split traffic across the multiple backbones 202 based on the final destination of the traffic (e.g., peering edge 206 can distribute traffic based on IP destination prefix). Then each of the backbones 202 forwards traffic through its associated customer edge 210 to the final customer 208 destination.

This multiple parallel backbone network 200 can have many advantages. For example, parallel backbone networks 202 make switching needs smaller in each backbone, so Ethernet switches and/or MERs can be used. In addition, the parallel backbone configuration 200 can leverage existing routing and control protocols, such as BGP tools like traffic engineering, confederations, MBGP, and the like. The use of the traffic engineering protocols can help steer traffic to the appropriate backbone network(s) 202. Further, with the existence of multiple backbone networks 202, fault tolerant backup systems can be created for mission critical applications.

That is, one or more backbone networks 202 can be used for disaster recovery and/or back-up purposes.

Further, in yet other embodiments, the parallel backbones 202 can be organized and utilized based on different factors. For example, a peer 204 could have one or more backbone networks 202 dedicated to it. Similarly, a customer network 208 (e.g., an ISP network) could have one or more backbone networks 202 dedicated to it. In yet other embodiments, customers 208 can be allocated across backbones 202 based on traffic and/or services. For example, Voice Over IP (VoIP) might use one or more backbones 202, while other IP service might use other backbones 202. Thus, backbones 202 can be provisioned by peer 204, customer 208, service, traffic volume or any other suitable provisioning parameter.

Figure 3:
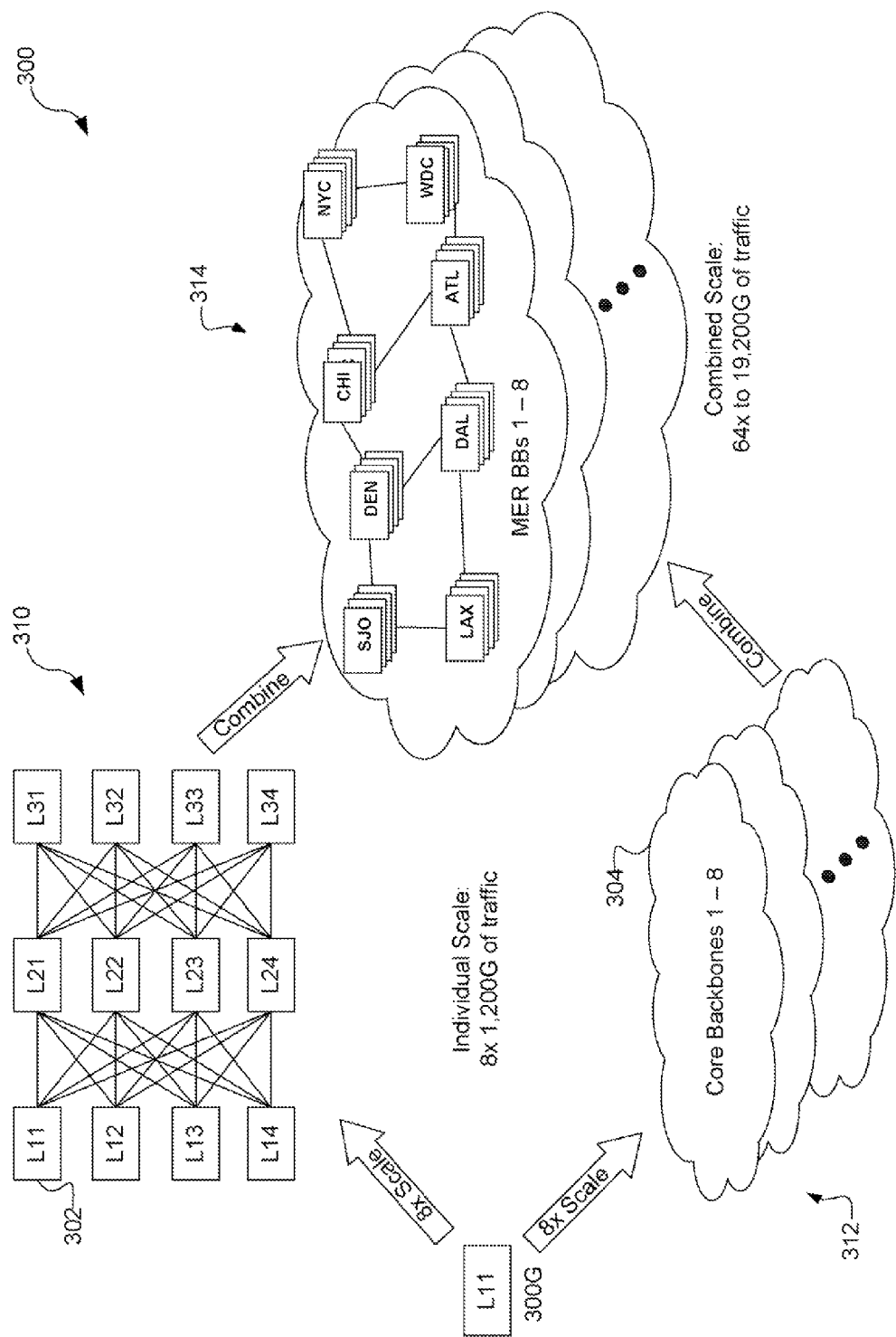
FIG. 3 is a diagrammatic illustration of a combination of the multichassis Ethernet router shown in FIG. 1 and the multiple parallel backbones shown in FIG. 2 connected between sites in accordance with another embodiment of the invention.

Further, as illustrated in FIG. 3, a combination of multi-chassis Ethernet routers (MER) 302 and parallel backbones (N×BB) 304 can be used for even greater scaling. For example, as illustrated in the example in FIG. 3, a 300G Ethernet switch 306 capacity could be increased 64× to 19,200G using a combination of MER 302 and parallel backbones 304. In this example, an 8× MER 310 and an 8× parallel backbone architecture 312 is combined to obtain a 64× scalability multiple parallel MER-based network architecture 314. Scalability can be even larger if larger MERs 302 (e.g., 16× or 32×) and/or more parallel backbones 304 are used. Thus, these technologies used alone and/or together can help scale capacity greatly.

Figure 4:
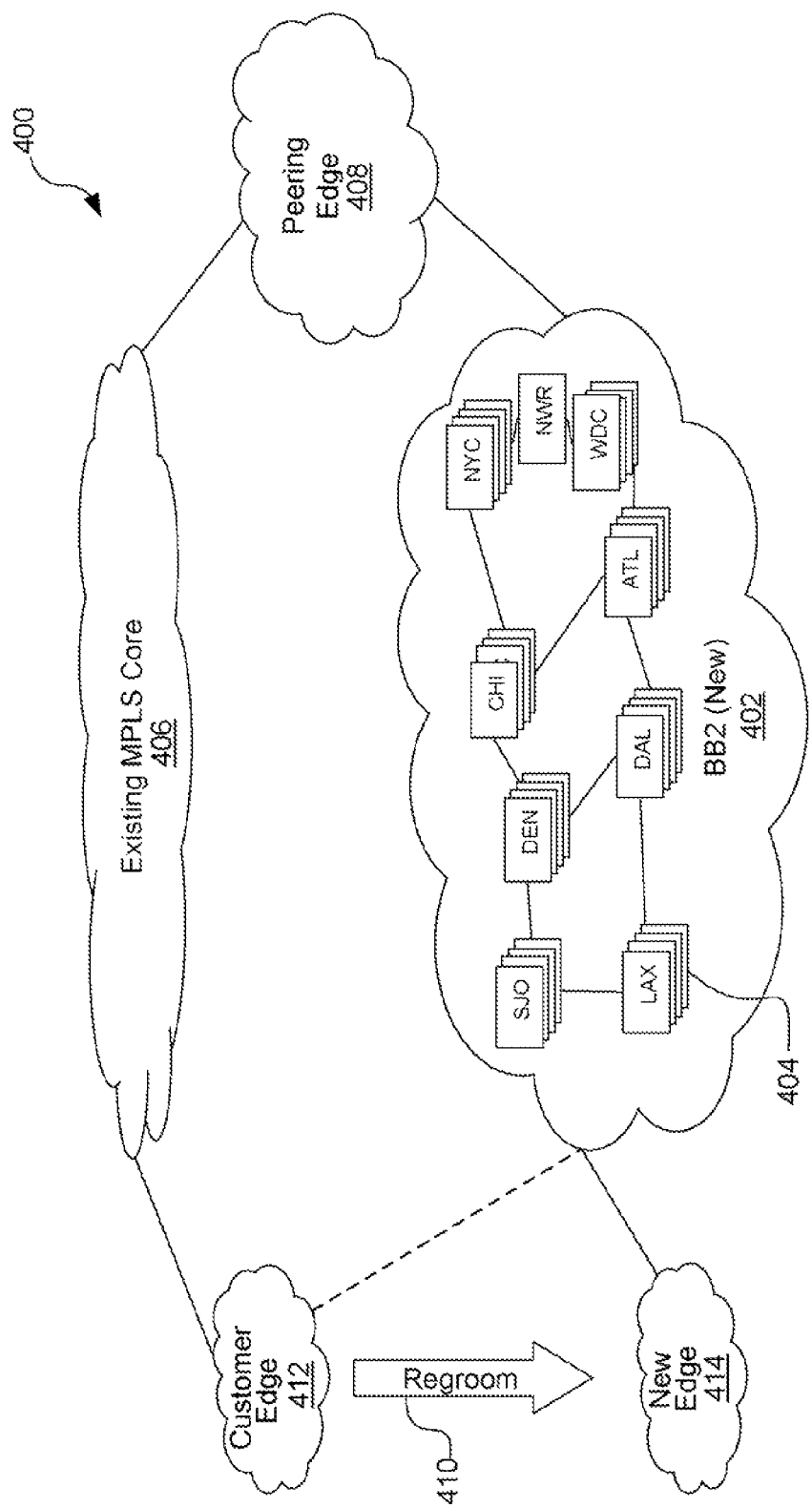
FIG. 4 is a diagrammatic illustration of a multichassis Ethernet router-based core network in parallel with one or more Multiple protocol Label Switching (MPLS) core networks providing packet routing between sites, wherein a subset of the customer/provider packet traffic is regroomed or migrated to a second customer/provider edge network in accordance with another embodiment of the invention.

Further, as illustrated in FIG. 4, an Ethernet-based core network 402 (e.g., a core network based on MERs 404) can be added as a parallel core network 402 to existing MPLS core networks 406, thus adding easy scalability at a reasonable price without having to replace existing core networks 402. The new parallel core network 402 and the MPLS core network 406 are interconnected at peering sites in a peering edge network 408. In this implementation, some existing customers as well as new customers could be migrated 410 from an existing customer edge network 412 to a new customer edge network 414. Traffic for the customers who are migrated to the new customer edge network 414 could be routed to the new Ethernet-core backbone 402. Alternatively, specific services, such as VoIP could be put on the new backbone 402, while leaving other services on the MPLS network 406. Many different scenarios of use of the two cores could be contemplated and used.

Figure 5:
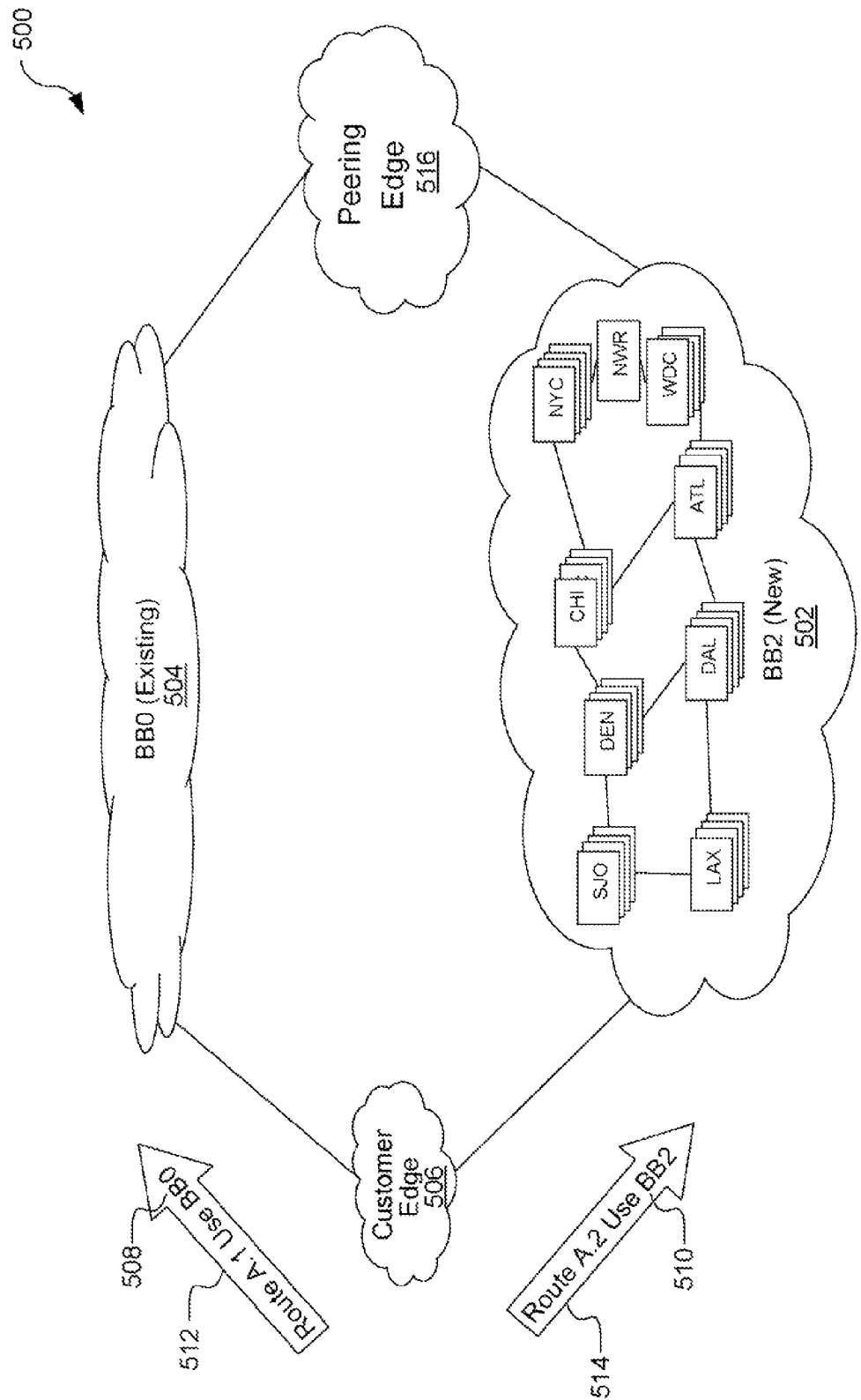
FIG. 5 is a diagrammatic illustration of a MER-based backbone network in parallel with an MPLS backbone network providing packet routing between a single customer/provider edge network and a peering edge network in accordance with one embodiment of the invention.

FIG. 5 is another illustration of the Ethernet-based parallel core 502 in parallel with an existing MPLS core 504. External least cost routing protocol techniques, such as BGP techniques, can be used to select which backbone to use on a per destination basis. To illustrate with the embodiment of FIG. 5, destination addresses A.1 and A.2 are advertised through a customer edge network 506. Candidate routes are marked with a BGP community identifier, such as community string 508 or 510 (and IP next hop loopback address), as illustrated with advertisements 512 and 514, respectively. In the particular scenario shown in FIG. 5, the community strings are used in the least-cost routing process to route packets destined for address "A.1" through backbone 0 (BB0), and to route packets destined for address "A.2" through backbone 2 (BB2).

As such, community strings can effectively force packets through the backbone networks based on the destination address. The selection can be done on a route by route basis and could vary based on source. In one embodiment, provider edge devices in the provider edge network 516 select the backbone based on route. Alternatively, a customer-based global policy can be used so that all traffic exiting a specific set of customer parts would use the same backbone. Route selection and route maps can be automatically generated by capacity planning tools.

LAN in the Middle (LIM)

Figure 6:
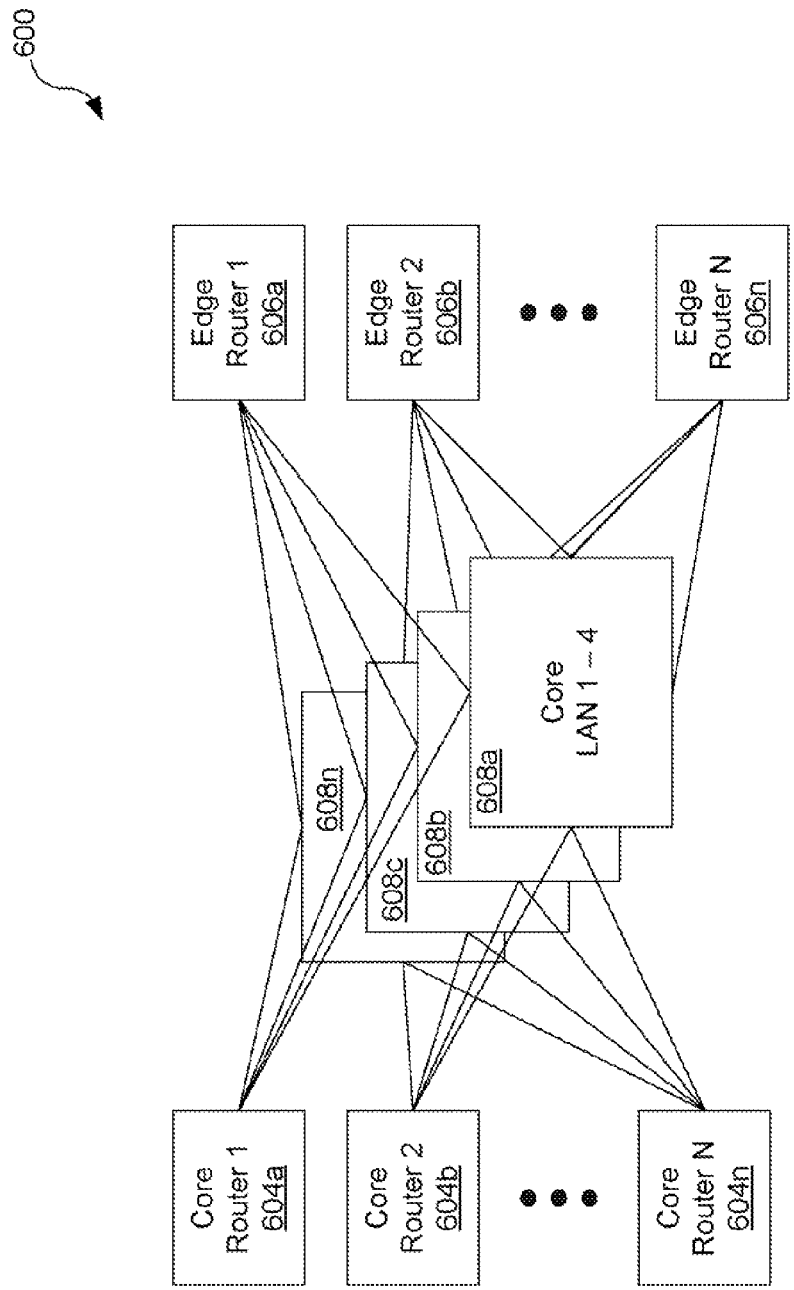
FIG. 6 is a diagrammatic illustration of multiple core local area networks (LANs) communicably connected between one or more core routers and one or more edge routers in accordance with another embodiment of the invention.

Another network implementation that could used to scale backbone cores is the LIM. One embodiment of a LIM 602 is illustrated in FIG. 6. In the illustrated embodiment, core routers 604a-604n are connected to edge routers 606a-606n through Ethernet switches 608a-608n. This is a similar configuration to the MERs discussed above, except existing core routers and edge routers are used in stages 1 and 3, instead of all stages using Ethernet switches. The benefit of this configuration is that the existing routers can be scaled larger without having to replace them with Ethernet switches. Using Ethernet switches in the middle layer and using CLOS matrices, as discussed above, will increase capacity of the existing core routers 604 and edge routers 606. In one embodiment, the core 604 and edge routers 606 will be responsible for provisioning the traffic through the matrix 608.

Figure 7:
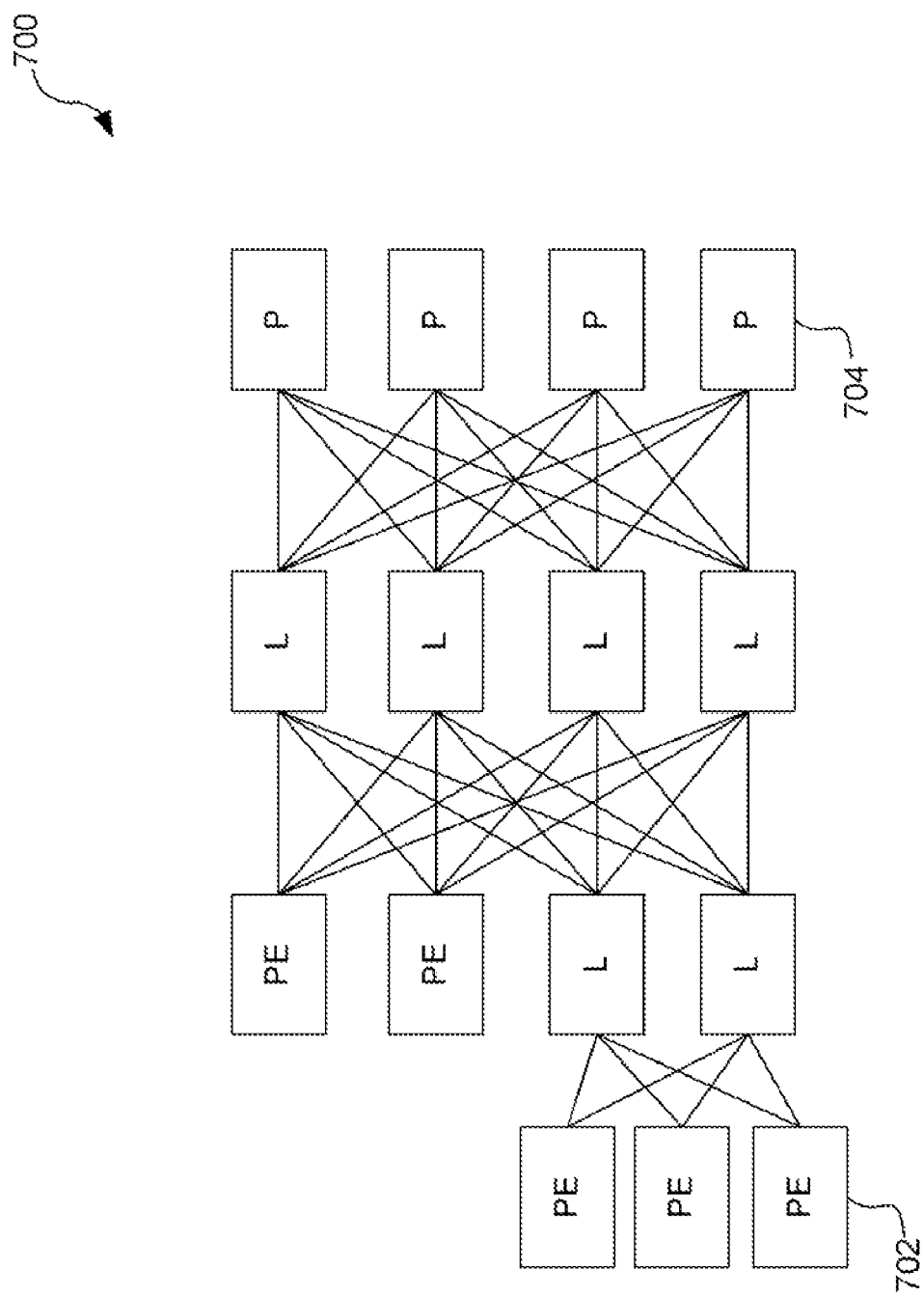
FIG. 7 is a diagrammatic illustration of an alternative LAN in the middle (LIM).

FIG. 7 is a diagrammatic illustration of an alternative embodiment of a LIM 700. Customer facing provider edges (PE) 702 can, for example, have 4×10G to the LIM. With a 1+1 protection, this would allow 20G customer facing working traffic. On the WAN facing side, each provider or core router (P) 704 has 4×10 G to the LIM. With 1+1 protection, this allows at least 20 G of WAN traffic.

Routing Through Multiple Backbone Network Architecture

Figure 8:
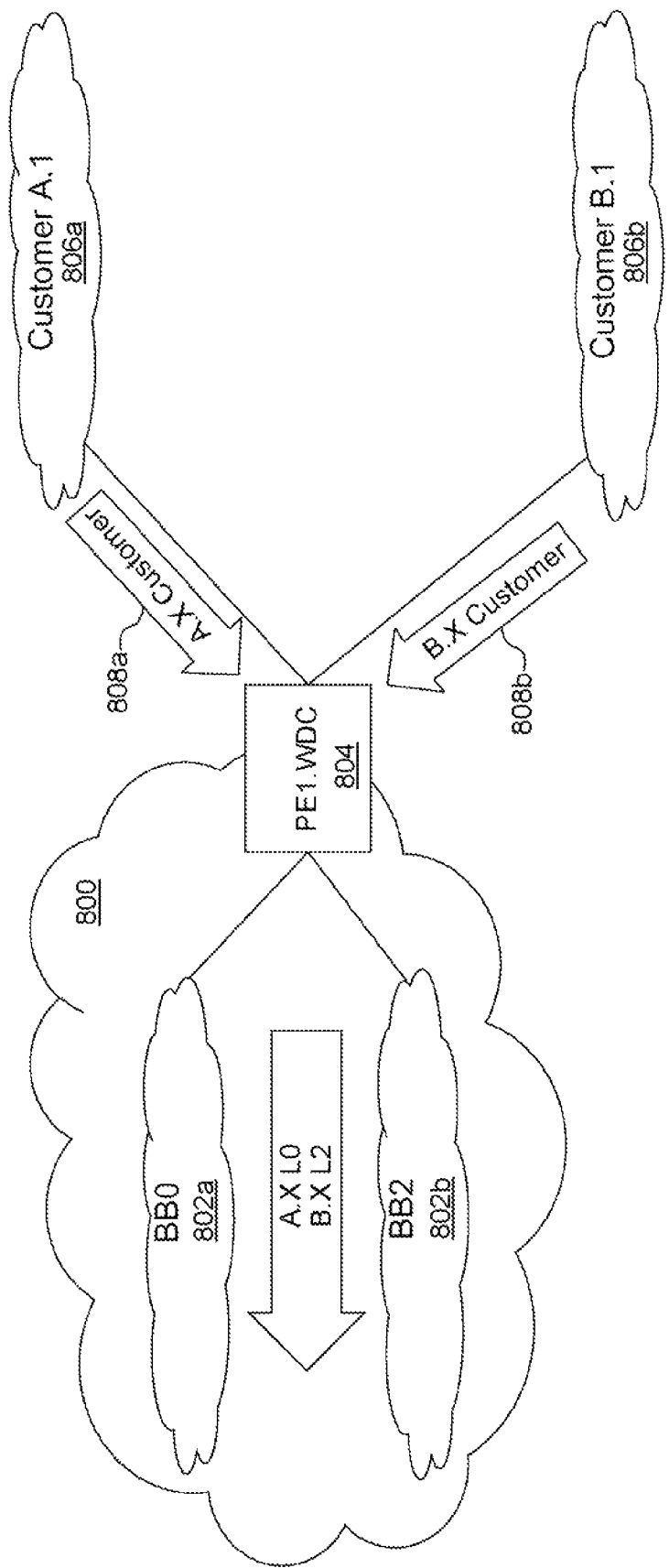
FIG. 8 illustrates an exemplary network architecture including multiple parallel backbone networks, wherein customer addresses are advertised and associated with next hop loopback addresses, whereby packets destined for each of those addresses are routed through a selected backbone network.

FIG. 8 illustrates an exemplary network 800 including multiple parallel backbone networks 802a-802b and a provider edge device 804. The network 800 provides backbone network services to first and second customer networks, such as customer network A 806a and customer network B 806b. Customer network A 806a has an associated IP address denoted here as A.1 for ease of illustration, and customer network B 806b has an associated IP address of B.1. IP addresses reachable on the customer network A 806a are more generally denoted as A.X and IP addresses reachable on the customer network B 806b are more generally denoted as B.x.

Nodes, such as routers, on the customer network A 806a and the customer network B 806b advertise A.X addresses and B.X addresses, respectively, so that the provider edge device PE1 804, and other network 800 nodes, can determine how to route packets to the A.X addresses and B.X addresses. Advertisements from customer network A 806a and customer network B 806b are illustrated by arrows 808a and 808b, respectively.

PE1 804 is labeled with site identifier "WDC", which stands for Washington D.C. Thus, in the illustrated scenario. PE1 804 handles communications associated with customer networks in the Washington D.C area. The use of WDC, or any other specific site identifier, is merely for illustrative convenience, and it will be understood by those skilled in the art that the processes described here with respect to PE1 804 can be carried out by any provider edge device, regardless of the customer site. The description here relates to processes for routing packets to customer addresses when multiple backbone networks are employed. Therefore, although nodes at addresses A.X and B.X may be both sources and destinations for data, addresses A.X and B.X are referred to as "destination addresses" here for illustrative convenience.

Routing through the network 800 can be performed according to any of numerous criteria or policies. Examples include cost-based routing (e.g., least cost routing), customer specified multi-exit discriminators (MEDs), and local preference settings. For purposes of illustration, it is assumed to customer specified policies and local preference settings are honored, and the manner of routing through the network 800 is according to a least cost routing policy.

PE1 804 receives one or more advertisements from nodes in customer network A 806a and customer network B 806b. The PE1 804 determines which of the backbone networks to assign to A.X addresses and which of the backbone networks to assign to the B.X addresses. In one embodiment, the PE1 selects backbone networks based on an external least cost routing policy, such as Border Gateway Protocol (BGP). In this embodiment, the shortest exit behavior is maintained regardless of the backbone network that is selected for each of A.X addresses and B.X addresses. In the particular scenario shown in FIG. 8, backbone network 802a is selected to handle communications associated with customer network A 806a and backbone network 802b is selected to handle communications associated with customer network B 806b.

To enforce the policy of using backbone network 802a for A.X addresses and backbone network 802b for B.X addresses, a next hop least cost routing protocol metric is used. In one embodiment, a next hop IGP metric is used to enforce route selection. PE1 804 advertises a first next hop loopback address L0 associated with A.X addresses and a second next hop loopback address L1 associated with B.X addresses. Address L0 and address L2 each are associated with ports on PE1 804. In one embodiment, the PE1 uses OSPF tagging to propagate tags associated with each of L0 and L2 through backbone network 802a and backbone network 802b. As shown in more detail below, cost metrics can be associated with next hop loopback addresses in such a way that packets destined for A.X addresses are routed through backbone network 802a and packets destined for B.X addresses are routed through backbone network 802b.

In accordance with one embodiment, PE1 804 generates a route map that includes routing information related to A.X addresses and B.X addresses. In the particular scenario shown in FIG. 8, the route map may have an association between A.X and L0 and another association between A.X and backbone network 802a (BB0). Similarly, the route map may have an association between B.X and L2 and another association between B.X and backbone network 802b (BB2). The identifiers BB0 and BB2 are referred to as community identifiers, and can be propagated through the backbone networks in association with their assigned customer address. A simplified example of a route map is shown below for illustration:

PE1.WDC Route Map
Match A.X.
set next hop L0.PE1.WDC.CUST.NET
set community BB0
Match B.X.
set next hop L2.PE1.WDC.CUST.NET
set community BB2

Figure 9:
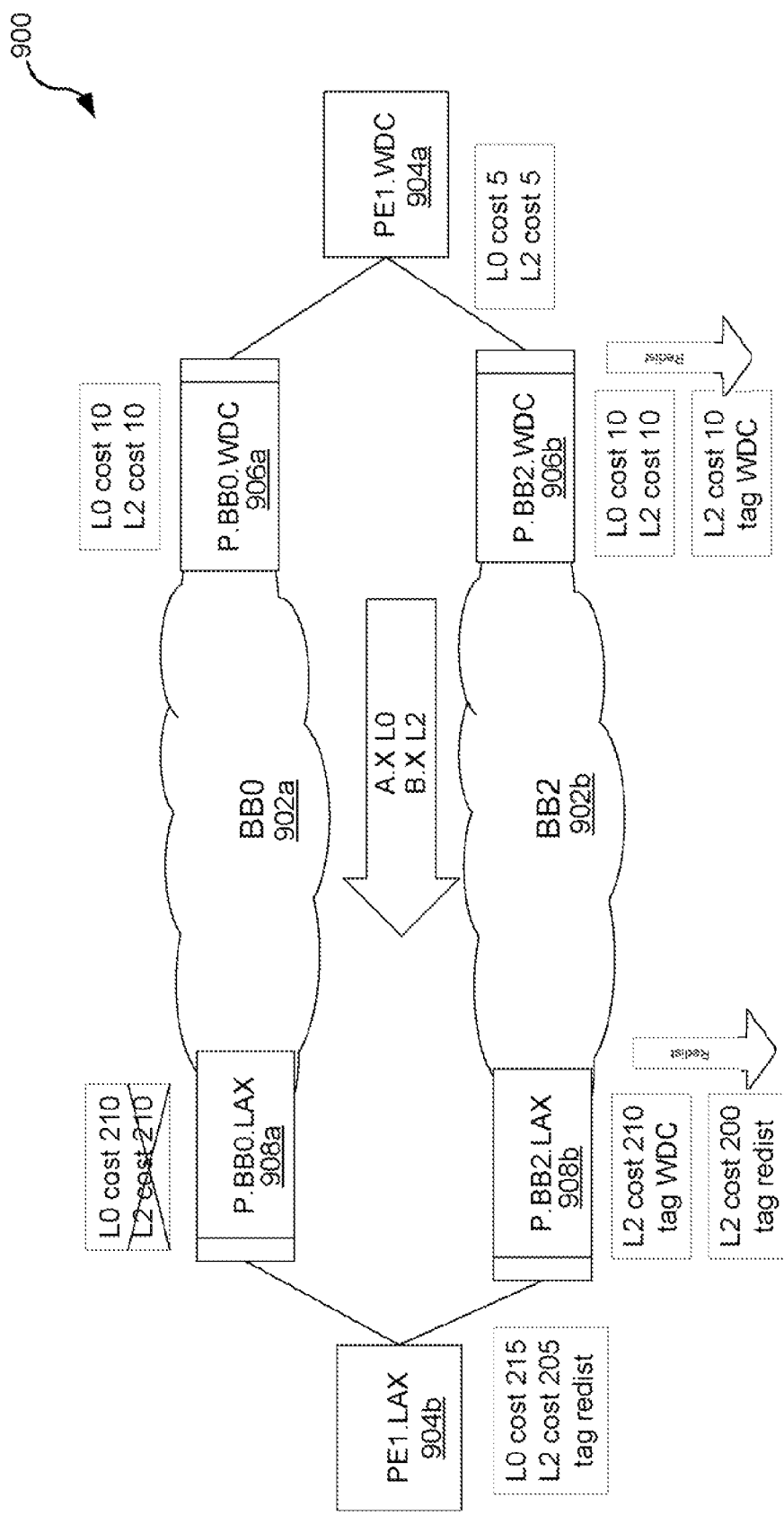
FIG. 9 illustrates the exemplary network architecture shown in FIG. 8, wherein advertisements are tagged with backbone identifiers to indicate destination-based backbone routes, and costs are assigned to next hop loopback addresses to enforce routing of packets through an associated backbone network.
Figure 10:
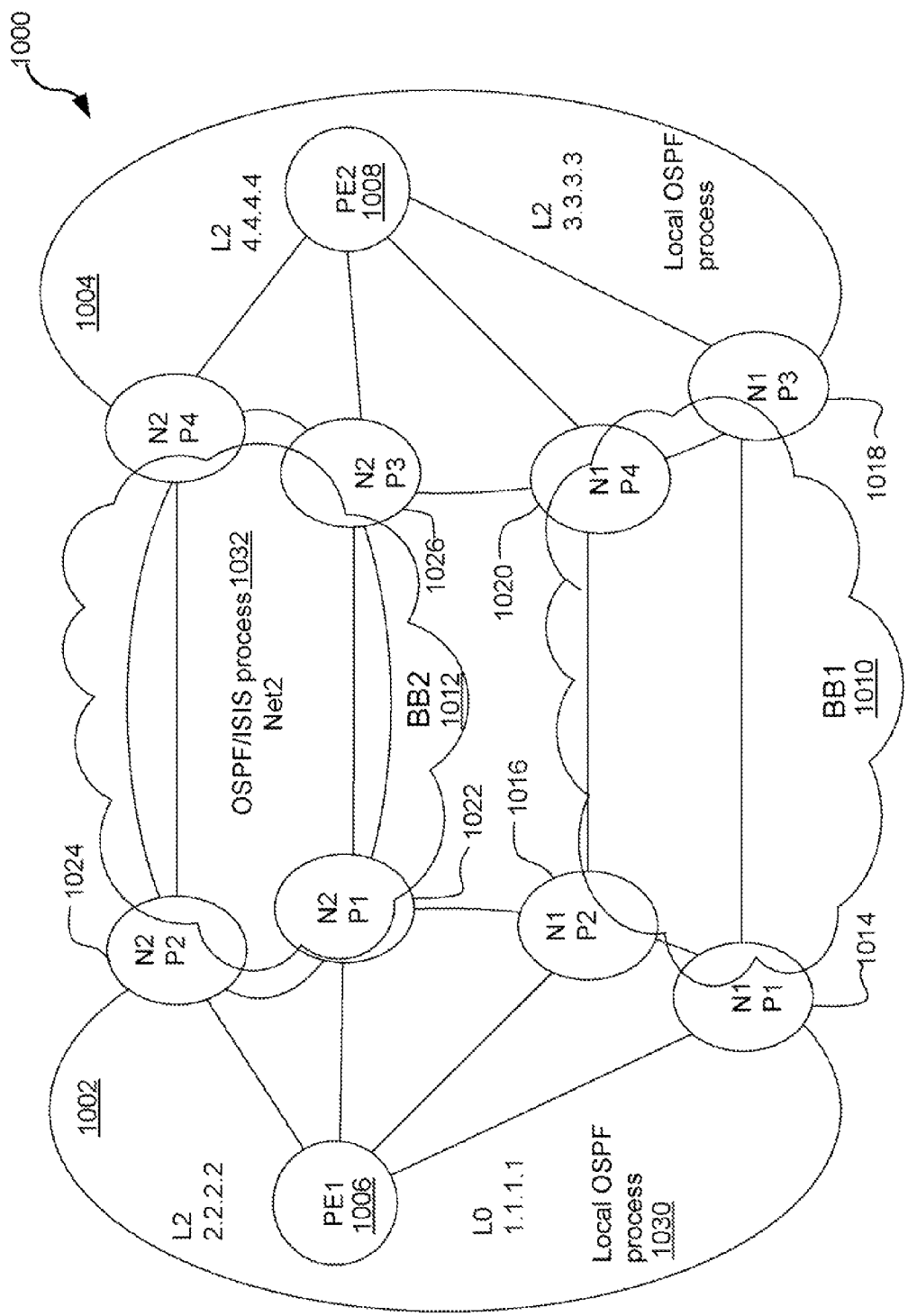
FIG. 10 illustrates a dual internal cost-based link state generation process in which edge routers on the edges of backbone networks in a multiple parallel backbone network architecture run two internal cost-based link state generation processes for a wide area network facing side and a local area network facing side.

Initially, a provider of backbone network services will have one backbone network, which is a wide area network. The backbone network services provider may add one or more additional backbone area networks to its network architecture for a number of reasons. Additional backbone networks may provide for better routing efficiency or scalability. The backbone network service provider may increase the number of backbone networks as a result of a merger with another backbone network service provider. Regardless of the reason for adding one or more backbone networks, the backbone network service provider can carry out a process of migrating some network service provider routes to the one or more added backbone networks. FIGS. 9-10 illustrate a process that could be carried out to support the migration of ISP routes in accordance with one embodiment.

FIG. 9 illustrates the exemplary network architecture shown in FIG. 8, wherein community strings are used to facilitate destination-based selective backbone network routing, and wherein costs are assigned to next hop loopback addresses in a manner that enforces routing of packets through an assigned backbone network. For ease of illustration, only two backbone networks are shown: BB0 902a and BB2 902b. It will be understood that more backbone networks may be provided. A first provider edge device PE1.WDC 904a interfaces with customer networks in Washington D.C., while a second provider edge device PE1.LAX 904b interfaces with customer networks in Los Angeles.

PE1.WDC 904a is communicably connected to a first WDC-based core node 906a, labeled P.BB0.WDC, on BB0 902a, and a second WDC-based core node 906b, labeled P.BB2.WDC, on BB2 902b. PE1.LAX 904b is communicably connected to a first LAX-based core node 908a, labeled P.BB0.WDC, on BB0 902a, and a second LAX-based core node 908b, labeled P.BB2.WDC, on BB2 902b.

In the illustrated scenario, next hop loopback address L0 has been assigned to customer addresses A.X and next hop loopback address L2 has been assigned to customer addresses B.X. Embodiments advertise L0 and L2 in a manner that ensures that address L0 is reached via BB0 902a and L2 is reached via BB2 902b. In one specific scenario, B.X traffic is migrated to BB2 902b using a cost-based redistribution process.

To illustrate, PE1.WDC 904a may advertise L0 at an initial cost and L2 at an initial cost to both the first WDC-based core node 906a and the second WDC-based core node 906b. The initial cost may be the same. The second WDC-based core node 906b redistributes the L0 and L2 addresses by advertising only L2 with a tag of WDC. The second core node 906b typically adds a cost to the initial cost attributed to L2. The second LAX-based core node 908b receives the advertisement and forms another advertisement.

In forming this advertisement, the second LAX-based core node 908b reduces the cost associated with address L2 to be slightly less than the cost associated with L0. The second LAX-based core node 908b includes a "redistribute" tag in the advertisement and communicates the advertisement to PE1.LAX 904b. PE1.LAX 904b creates a route map including an association between B.X, L2, and BB2 902b. As such, when PE1.LAX 904b receives packets that are addressed to B.X, PE1.LAX 904b will first identify L2 as the least cost route to reach B.X, and will then determine that the second LAX-based core node 908b is the least cost node to send the packets to.

FIG. 10 illustrates a dual internal cost-based link state generation process in which edge routers on the edges of backbone networks in a multiple parallel backbone network architecture run two internal cost-based link state generation processes for a wide area network facing side and a local area network facing side.

The network configuration 1000 illustrated in FIG. 10 includes a first local area network 1002 and a second local area network 1004. Communicably connected to the LAN 1002 is a provider edge node PE1 1006; communicably connected to the LAN 1004 is another provider edge node PE2 1008. A first backbone network BB1 1010 and a second backbone network BB2 1012 are communicably disposed between the first LAN 1002 and the second LAN 1004. The first backbone network 1010 includes four core nodes: N1P1 1014, N1P2 1016, N1P3 1018, and N1P4 1020. The second backbone includes four core nodes: N2P1 1022, N2P2 1024, N2P3 1026, and N2P4 1028.

In the scenario illustrated in FIG. 10, the second backbone network 1012 is added to the network configuration 1000, in which the first network backbone network 1010 initially existed and handled all provider/customer communication traffic between the first provider edge node 1006 and the second provider edge node 1008. After the second backbone network 1012 is added, selected provider/customer communication traffic can be handled by the second backbone network 1012. The first backbone network 1010 may or may not serve as a backup network to handle communication traffic that is handled by the second backbone network 1012.

A redistribution process is performed to cause the selected communication traffic to handled by the second backbone network 1012. After the communication traffic is selected to be handled by the new backbone network 1012, the redistribution process generally involves performing an internal least cost routing protocol process within the first LAN 1002 and the second LAN 1004, and performing another internal least cost routing protocol process between core nodes in the second backbone network 1012. First, selected provider/customer addresses and/or routes are assigned to the backbone network 1012, and a local port address (e.g. L2, 2.2,2,2) is assigned to the selected customer/provider addresses and/or routes. Then, internal least cost routing protocol processes are performed to propagate the local port addresses throughout the network configuration 1000 to ensure that communication traffic is routed across the correct backbone network.

To illustrate, a local or LAN-based OSPF process is performed between PE1 1006 and the core nodes N1P1 1014, N1P2 1016, N2P1 1022, and N2P2 1024. This LAN-based OSPF process 1030 involves propagating OSPF tags to the core nodes. In the particular scenario illustrated in FIG. 10, PE1 1006 sends a first tag (e.g., tag1) to core nodes of N1P1 1014 and N1P2 1016 that corresponds to the route associated with a next hop loopback address L (1,1.1.1). PE1 1006 sends another tag (e.g., tag2) to the core nodes N2P1 1022 and N2P2 1024 that corresponds to the route associated with next hop loopback address L2 (2.2.2.2).

The core routers on the second backbone network 1012 perform another OSPF process 1032 within the second backbone network 1012. In the particular exemplary scenario, the core routers N2P1 1022 and N2P2 1024 propagate next hop loopback tag2 associated with address L2 (2.2.2.2) to core routers N2P3 1026 and N2P4 1028.

Figure 11:
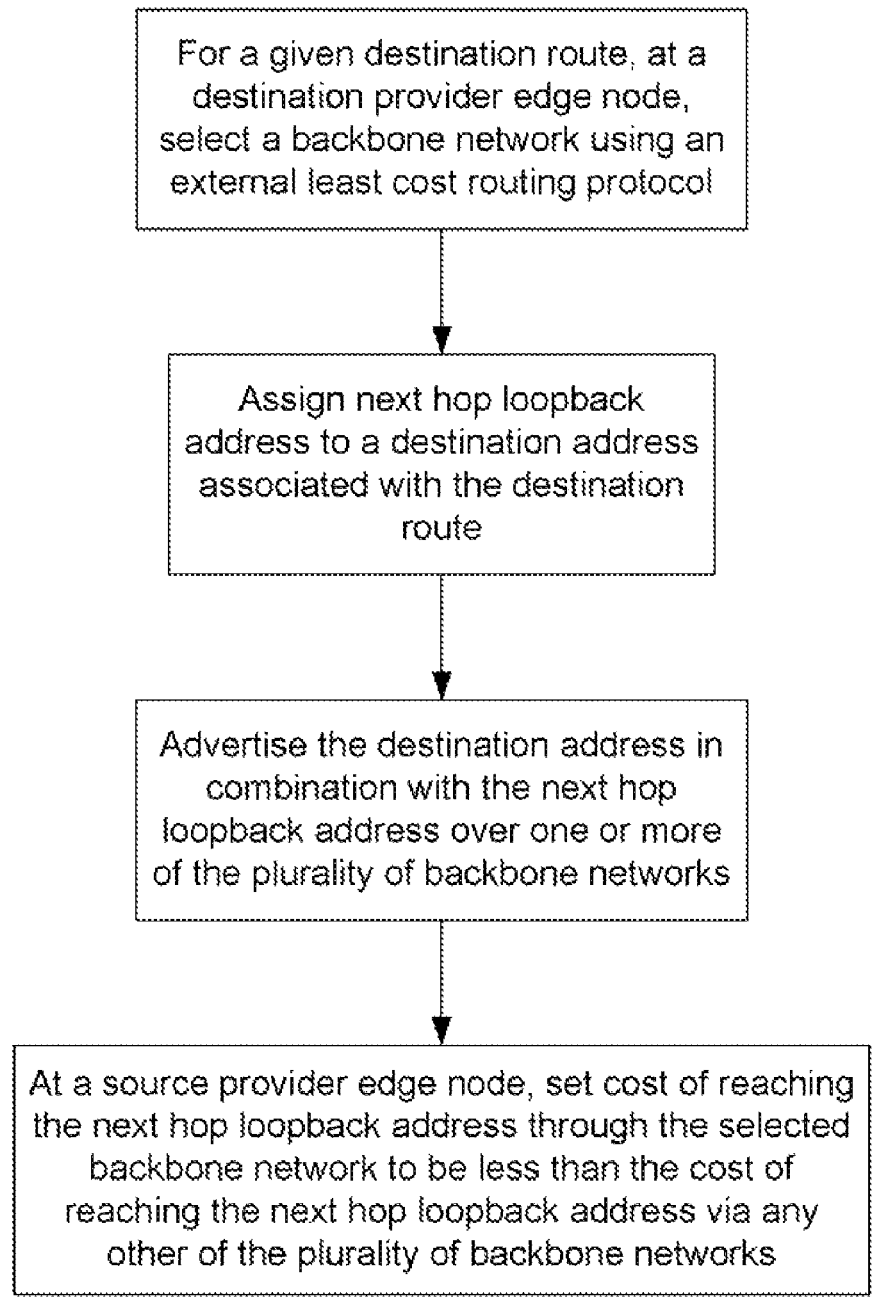
FIG. 11 is a flowchart illustrating an algorithm for carrying out routing in a multiple backbone network architecture in accordance with one embodiment.

FIG. 11 is a flowchart illustrating an algorithm 1100 for carrying out least cost routing in a multiple backbone network architecture. In this embodiment, it is assumed that a provider edge node learns of, or otherwise determines, destination network addresses on networks being served, such as ISP networks. In a selecting operation 1102, a provider edge node selects a backbone for handling communications associated with one or more destination network addresses. In one embodiment of the selecting operation, for each destination network address, the provider edge node performs an external least cost routing protocol process, such as border gateway protocol (BGP), to choose a backbone network from a plurality of backbone networks, which will result in least cost routing of packets to the destination network address.

In an assigning operation 1104, a next hop loopback address is assigned to each destination network address. The next hop loopback address corresponds to a port on the provider edge network that is reachable via the selected backbone network. In an advertising operation 1106, each next hop loopback address and associated destination network address is advertised over one or more of the backbone networks. One embodiment of the advertising operation 1106 involves carrying out an internal least cost routing protocol process, such as OSPF/ISIS or other Internal Gateway Protocol (IGP) process. Using OSPF, tags associated with the next hop loopback address and/or the assigned backbone network are propagated through one or more backbone networks to identify backbone routes to be used for associated destination network addresses.

Figure 12:
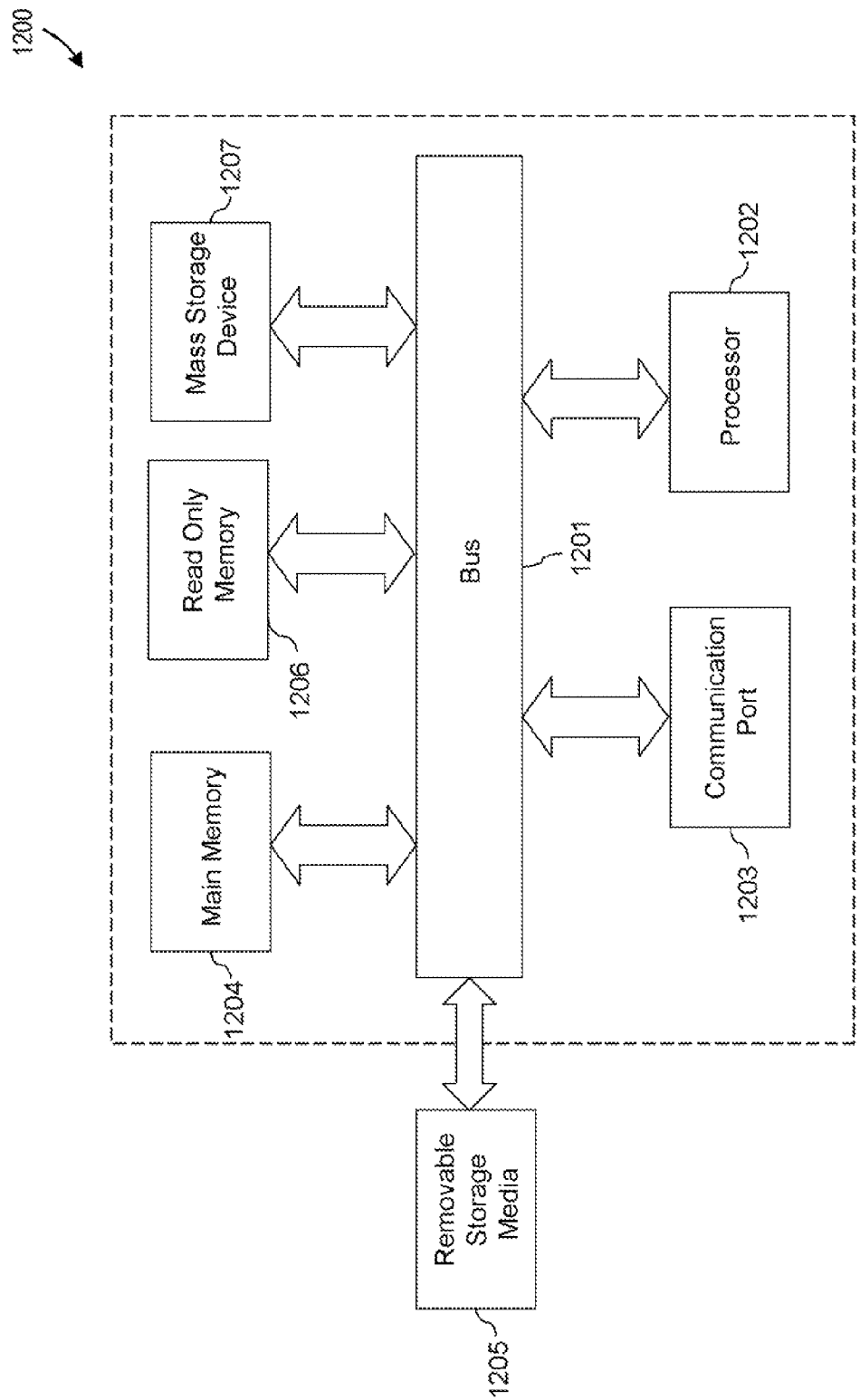
FIG. 12 illustrates a general purpose computing device in which embodiments of the invention can be implemented.

In a setting operation 1108, another provider edge node, such as a source provider edge node, sets a cost associated with each next hop loopback address to be reached across one or more of the backbone networks. In one embodiment, an Open Shortest Path First (OSPF) and/or ISIS protocol process is performed between the source provider edge node and a core routing node on the assigned backbone network to cause the cost of reaching the next hop loopback address to be lower when using the assigned backbone network than any of the other networks. In this process, the next hop loopback address can be tagged with the backbone network associated with the next hop loopback address, Exemplary Computing Device FIG. 12 is a schematic diagram of a computing device 1200 upon which embodiments of the present invention may be implemented and carried out. The components of the computing device 1200 are illustrative of components that a SIP registration server may include or a server computer that carries out a relocation determination process as discussed above.

As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 1200 includes a bus 1201, at least one processor 1202, at least one communication port 1203, a main memory 1204, a removable storage media 1205, a read only memory 1206, and a mass storage 1207. Processor(s) 1202 can be any know processor, such as, but not limited to, an Intel® Itanium® or Itanium 2® processor(s), or AMD® Opteron® or Athlon MP® processor(s), or Motorola® lines of processors. Communication port(s) 1203 can be any of an RS-232 port for use with a modem based dialup connection, a 10/100 Ethernet port, a Gigabit port using copper or fiber, or a USB port. Communication port(s) 1203 may be chosen depending on a network such a Local Area Network (LAN Wide Area Network (WAN), or any network to which the computing device 1200 connects. The computing device 1200 may be in communication with peripheral devices (not shown) such as, but not limited to, printers, speakers, cameras, microphones, or scanners.

Main memory 1204 can be Random Access Memory (RAM), or any other dynamic storage device(s) commonly known in the art. Read only memory 1206 can be any static storage device(s) such as Programmable Read Only Memory (PROM) chips for storing static information such as instructions for processor 1202. Mass storage 1207 can be used to store information and instructions. For example, hard disks such as the Adaptec® family of SCSI drives, an optical disc, an array of disks such as RAID, such as the Adaptec family of RAID drives, or any other mass storage devices may be used.

Bus 1201 communicatively couples processor(s) 1202 with the other memory, storage and communication blocks. Bus 1201 can be a PCI/PCI-X, SCSI, or USB based system bus (or other) depending on the storage devices used. Removable storage media 1205 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Although the present invention has been described with reference to preferred embodiments, those skilled in the art will recognize that changes can be made in form and detail without departing from the spirit and scope of the invention.

What is claimed is:

1. A method for routing packets in a network comprising a plurality of backbone networks, the method comprising:
    assigning a first backbone network of the plurality of backbone networks to a first destination network address;
    associating a first next hop loopback address with the first destination network address; and
    advertising the first destination network address in combination with the first next hop loopback address through the first backbone network, whereby packets addressed to the first destination network address are routed through the first backbone network;
    assigning a second backbone network of the plurality of backbone networks to a second destination network address;
    associating a second next hop loopback address with the second destination network address:
    advertising the second destination network address in combination with the second next hop loopback address through the second backbone network, whereby packets addressed to the second destination network address are routed through the second backbone network; and
    setting an internal least cost routing metric associated with the second next hop loopback address in the second backbone network equal to a value less than another internal least cost metric associated with the first next hop loopback address in the first backbone network.

2. The method as recited in claim 1, further comprising associating a first community identifier representing the first backbone network with the first destination network address.

3. The method as recited in claim 2, further comprising creating a route map including an association between the first destination network address and the first next hop loopback address and an association between the first destination network address and the first community identifier.

4. The method as recited in claim 1, wherein packets addressed to the first destination network address are routed through the first backbone network to the first next hop loopback address using an Internal Gateway Protocol.

5. The method as recited in claim 1, further comprising setting an internal least cost routing metric to a provider edge site identifier.

6. The method as recited in claim 1, wherein the first destination network address and the second destination network address are associated with different routes through one or more customer edge networks.

7. The method as recited in claim 1, wherein an edge router associated with the second backbone network supports two internal least cost routing protocols.

8. The method as recited in claim 7, wherein the edge router performs a first internal least cost routing process through a port on the edge router facing the second backbone network, and wherein the edge router performs a second least cost routing process through another port on the edge router facing an edge network.

9. The method as recited in claim 1, wherein the first backbone network serves as a backup network to the second backbone network.

10. A non-transitory computer-readable medium having computer-executable instructions for causing a computer to perform the method recited in claim 1 for routing packets in a network comprising a plurality of backbone networks.

11. A method for providing communications between provider networks, the method comprising:
    selecting a first backbone network from a plurality of backbone networks using an external least-cost routing protocol and assigning the first backbone network a first destination network address;
    associating a first next hop loopback address with the first destination network address, wherein the first next hop loopback address is reachable via the first backbone network;
    selecting a second backbone network from the plurality of backbone networks using an external least-cost routing protocol and assigning the second backbone network a second destination network address;
    associating a second next hop loopback address with the second destination network address, wherein the second next hop loopback address is reachable via the second backbone network;
    advertising the second destination network address in combination with the second next hop loopback address through the second backbone network, whereby packets addressed to the second destination network address are routed through the second backbone network;
    assigning a first least-cost routing metric to the first next hop loopback address, wherein the first least-cost routing metric is less than a second least-cost routing metric associated with the second next hop loopback address; and
    advertising the first next hop loopback address over the plurality of backbone networks, wherein advertising the first next hop loopback address comprises an indication of the first least-cost routing metric.

12. A method comprising:
    assigning a first destination network address to a first backbone network selected from a plurality of backbone networks using an external least cost routing protocol;
    associating a first next hop loopback address with the first destination network address, wherein the first next hop loopback address corresponds to a first port on a destination provider edge device in communication with the first backbone network;
    notifying a source provider edge device that the first next hop loopback address is reachable with least cost routing via the first backbone network;
    assigning a second destination network address to a second backbone network selected from the plurality of backbone networks;
    associating a second next hop loopback address with the second destination network address, wherein the second next hop loopback address corresponds to a second port on the destination provider edge device in communication with the second backbone network;

notifying the source provider edge device that the second next hop loopback address is reachable with least cost routing via the second backbone network; and setting an internal least cost routing metric associated with the second next hop loopback address in the second backbone network equal to a value less than the first next hop loopback address in the first backbone network.

13. The method as recited in claim 12, further comprising:

performing an internal least cost routing protocol between the source provider edge device and a source core router device.

14. The method as recited in claim 13, wherein the performing step comprises:

performing the internal least cost routing protocol process between the source core router device and a destination core router device to determine a cost associated with each of the first next hop loopback address and the second next hop loopback address.

* * * * *